United States Patent

Bell

[11] Patent Number: 5,538,484
[45] Date of Patent: Jul. 23, 1996

[54] BIAXIAL IDLER FOR CONTINUOUSLY VARIABLE TRANSMISSION

[76] Inventor: Tom W. Bell, 101 S. St. Asaph St., #2, Alexandria, Va. 22314-3128

[21] Appl. No.: 329,488

[22] Filed: Oct. 26, 1994

[51] Int. Cl.⁶ ........................................................ F16H 15/38
[52] U.S. Cl. .................................... 476/40; 476/51; 476/52
[58] Field of Search .................................... 476/40, 51, 52

[56] References Cited

U.S. PATENT DOCUMENTS

| 446,123 | 2/1891 | Pyle. | |
|---|---|---|---|
| 533,704 | 2/1895 | Campbell. | |
| 1,522,774 | 6/1921 | Foote. | |
| 2,096,039 | 8/1935 | Higgins. | |
| 3,160,023 | 12/1964 | Smith | 476/52 |
| 3,270,576 | 9/1966 | Goldwasser | 74/191 |
| 3,354,679 | 11/1967 | Fawick. | |
| 3,369,420 | 11/1968 | Spyra. | |
| 3,446,088 | 5/1969 | Grant | 476/40 |
| 4,421,495 | 12/1983 | Kulischenko. | |
| 4,448,087 | 5/1984 | Barzel | 476/51 |
| 4,660,427 | 4/1987 | Fenton | 74/63 |

FOREIGN PATENT DOCUMENTS

| 405809 | 4/1920 | Germany | 476/40 |

OTHER PUBLICATIONS

"Subaru Revives the Variable Transmission", Consumer Reports 500 (Aug. 1989).

"Automotive Traction Drive CVTs—An Overview", 861355 SAE Technical Paper Series (1986).

"Design of Traction Drives", Stuart H. Loewenthal and Erwin V. Zaretsky, 1154 NASA Reference Publication (1985).

"'Rubber–Band' Cars Are Coming Back", Mechanical Engineering 34 (Dec. 1984).

"Advances in Traction Drive Technology", S. H. Loewenthal and D. A. Rohn, 831304 SAE Technical Paper Series (1983).

Primary Examiner—Charles A. Marmor
Assistant Examiner—David Fenstermacher
Attorney, Agent, or Firm—Dorsey & Whitney

[57] ABSTRACT

A biaxial idler comprising a flexible and resilient toroid and a frame. The frame has the capability of allowing the toroid to rotate independently both about the toroid's annular axis and about a straight axis substantially orthogonal to that annular axis. The toroid's outer perimeter can thus roll in a direction parallel to the toroid's straight axis. This biaxial idler is useful in continuously variable transmissions, because it provides a simple and rugged method of transmitting torque continuously across a wide range of varying transmission ratios while suffering minimal frictive losses and wear.

20 Claims, 6 Drawing Sheets

BIAXIAL IDLER FOR CONTINUOUSLY VARIABLE TRANSMISSION

BACKGROUND

A. Field of Invention

This invention relates to idlers for continuously variable transmissions; specifically to such idlers that have more than one axis of rotation.

B. Description of the Prior Art

Most transmissions, such as those found on bicycles with derailleur gear-shifting mechanisms, or those found in manual or automatic shift motor vehicles, suffer three distinct disadvantages: 1) they offer only a limited number of fixed gear ratios; 2) these ratios can be changed only by disengaging the transmissions' driving and driven members, thereby temporarily halting the transfer of torque; and 3) such transmissions lose a significant amount of power to friction.

Continuously variable transmissions solve the first of these problems by offering a potentially infinite range of nondiscrete input/output torque ratios (or "gear" ratios). But most continuously variable transmissions still must either have driving and driven members disengaged during shifting or suffer from high frictive losses and wear. Although the toric type of continuously variable transmission can shift with the driving and driven members engaged, it requires a relatively complex shifting mechanism that cannot function when the transmission rests. See, for example, "Subaru Revives the Variable Transmission," *Consumer Reports* (August, 1989) pp. 500–501; Lubomyr O. Hewko, "Automotive Traction Drive CVT's—An Overview," SAE *Technical Paper Series*, No. 861355 (1986); Stuart H. Loewenthal and Erwin V. Zaretsky, "Design of Traction Drives," NASA Reference Publication, No. 1154 (1985); ME Staff Report, "'Rubber-Band' Cars are Coming Back," *Mechanical Engineering*, (Dec. 1984) pp. 34–38; S. H. Loewenthal, D. A. Rohn, and N. E. Anderson, "Advances in Traction Drive Technology," SAE *Technical Paper Series*, No. 831304 (1983).

The problem with these continuously variable transmissions lies in the idlers that they use. The idler of a continuously variable transmission conveys torque from the driving to the driven member of the transmission. It also changes the input/output torque ratio of the transmission by moving laterally across the rotating surfaces of the transmission's driving and driven members. The idler's lateral movement thus "shifts the gears" of a continuously variable transmission.

The idlers of most continuously variable transmissions are "uniaxial"; that is, they can rotate around only one axis at a time. This causes problems. Most continuously variable transmissions with uniaxial idlers can shift gears only by disengaging the idler from the driving and driven members (thereby halting the transfer of torque) and then moving the idler laterally. In the alternative, these transmissions shift gears by simply dragging the idler laterally across the surfaces of the driving and driven members (thereby causing significant frictive losses and undue wear). The toric continuously variable transmission, when equipped with a uniaxial idler, shifts only with the help of relatively complex machinery that inclines the idler and steers it across the transmission's driving and driven members as they rotate. This process fails to work when the driving and driven members rest.

An idler could avoid these problems by rotating around two or more substantially orthogonal axes at a time. Such an idler could roll laterally across the surfaces of the driving and driven members whether or not they are rotating. There would thus be no need to halt the transfer of torque while shifting gears, little power would be lost to friction, and wear would decrease. When used in a toric continuously variable transmission, such an idler could shift through a relatively simple process that works both when the transmission runs and when it does not.

Some inventors have tried to capture these advantages by designing idlers with multiple axes of rotation. See U.S. Pat. No. 3,270,576, filed February 1964 by D. Goldwater; and U.S. Pat. No. 4,448,087, filed March 1981 by E. Barzel. Such multiaxial idlers can, indeed, rotate simultaneously around several substantially orthogonal axes. But these designs incorporate many more axes than absolutely necessary. Having so many extra axes renders these multiaxial idlers unnecessarily complex, hard to build, prone to break, difficult to repair, and heavy.

Furthermore, the need to accommodate multiple axes tends to leave gaps along the edge of a multiaxial idler, exactly where the idler comes into contact with the driving and driven members. These gaps can cause a multiaxial idler to transmit torque roughly and discontinuously. U.S. Pat. No. 4,448,087 offers a design without such gaps, but only at the cost of additional complexity.

These limitations in the prior art of idler design betray a commonplace—but nonetheless erroneous—assumption. Examples from physics textbooks and familiar machinery encourage inventors to assume that solid bodies rotate only around rigid, straight axes. As described more fully below, however, this need not be the case.

SUMMARY OF THE INVENTION

Besides the objects and advantages afforded by any idler able to rotate around two or more substantially orthogonal axes, the present invention for a "biaxial" idler offers significant improvements over the prior art.

As its name implies, the biaxial idler rotates around exactly two substantially orthogonal axes. For reasons set forth above, this is the minimum number of axes required for an idler able to shift gears without disengaging the driving and driven members, to minimize frictive losses, and to reduce wear. This is also the minimum number of axes required for an idler that will allow a toric continuously variable transmission to shift gears with relative simplicity whether during motion or at rest. Because it uses only two axes, the biaxial idler escapes both the severe limitations of uniaxial idlers and the unnecessarily complexity of multi-axial idlers.

The biaxial idler offers all of the advantages of multiaxial idlers with none of their disadvantages. Thanks to its uncomplicated design, the biaxial idler has fewer parts, is easier to build, more rugged, simpler to repair, more amenable to miniaturization, and lighter than multiaxial idlers. Moreover, the biaxial idler can readily be built to present an unbroken edge to the transmission's driving and driven members. This ensures that the biaxial idler can transmit torque smoothly, quietly, and continuously.

The biaxial idler enjoys these advantages because it possesses two, and only two, axes of rotation. It attains such simplicity by using a mechanism unknown to the prior art: a curved axis of rotation. The prior art assumes that solid bodies rotate only around rigid, straight axes. In fact, however, a flexible and resilient structure can rotate around a curved axis.

The biaxial idler puts this insight to work by using a flexible and resilient toroidal structure to transfer torque from the driving to the driven member of a continuously variable transmission. By rotating about its curved, annular axis, this toroidal member can roll laterally across the driving and driven members. And by rotating like a wheel about a straight axis substantially orthogonal to that annular axis, the biaxial idler transmits torque from the driving to the driven members.

Further objects and advantages of the biaxial idler will become apparent from consideration of the drawings and description that follow.

BRIEF DESCRIPTION OF THE DRAWINGS

Note: drawings of closely related figures have the same number but different alphabetic suffixes.

FIGS. 6-A through 6-J show the biaxial idler's implementation in various types of continuously variable transmission.

DESCRIPTION OF THE PREFERRED EMBODIMENTS

Figure 1:
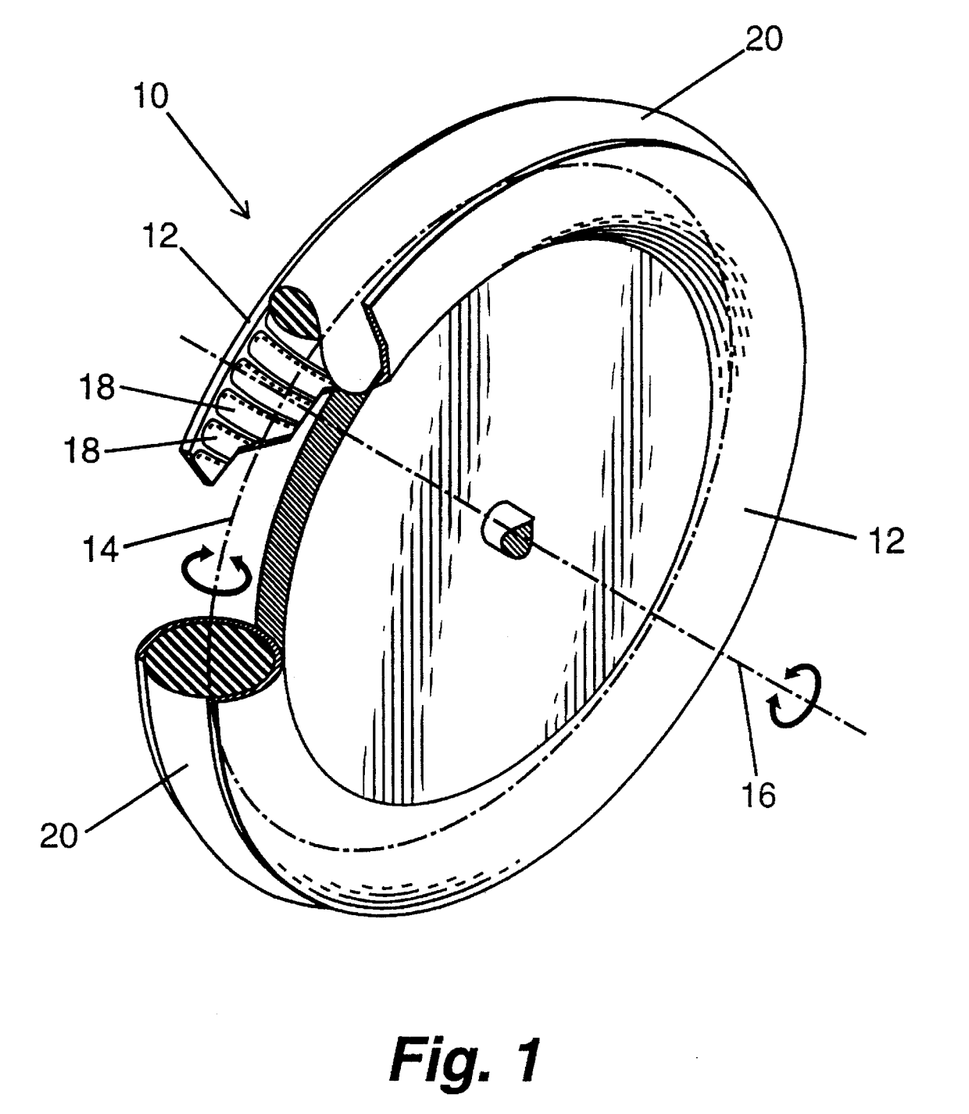
FIG. 1 shows an entire perspective view of a biaxial idler comprising a solid toroidal member and frame.

FIG. 1 shows an entire perspective view of the present invention for a biaxial idler 10 in one of its typical embodiments. A frame 12 holds in place a solid toroidal member 20. Both the frame and the solid toroidal member 20 appear in cross-section and cut-away views. The frame 12 and solid toroidal member 20 rotate together about a straight axis 16. In addition, the solid toroidal member rotates about an annular axis 14. The frame 12 has grooves 18 where it contacts the solid toroidal member 20.

Figure 2:
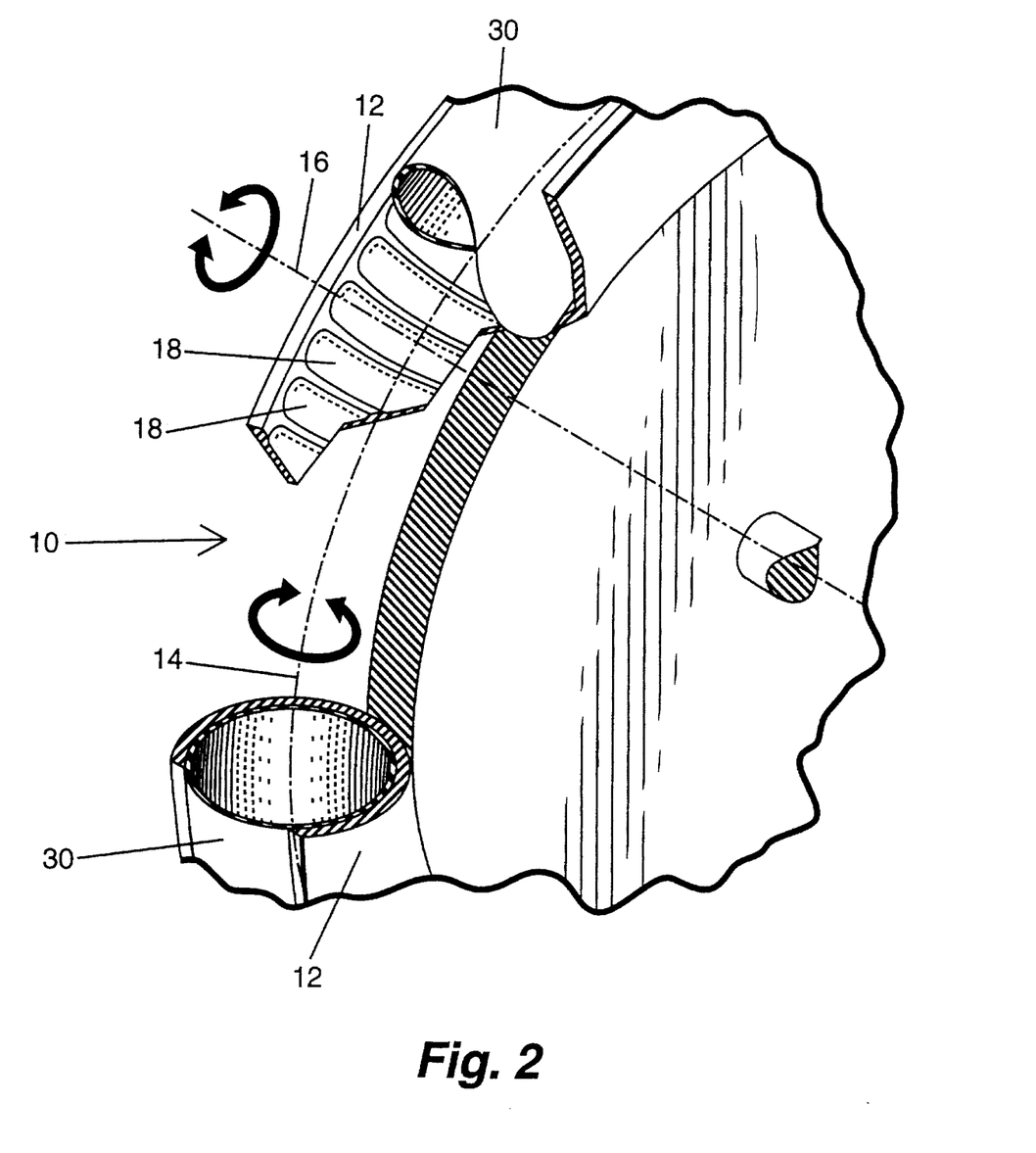
FIG. 2 shows a detail perspective view of a hollow toroidal member and frame.
Figure 3:
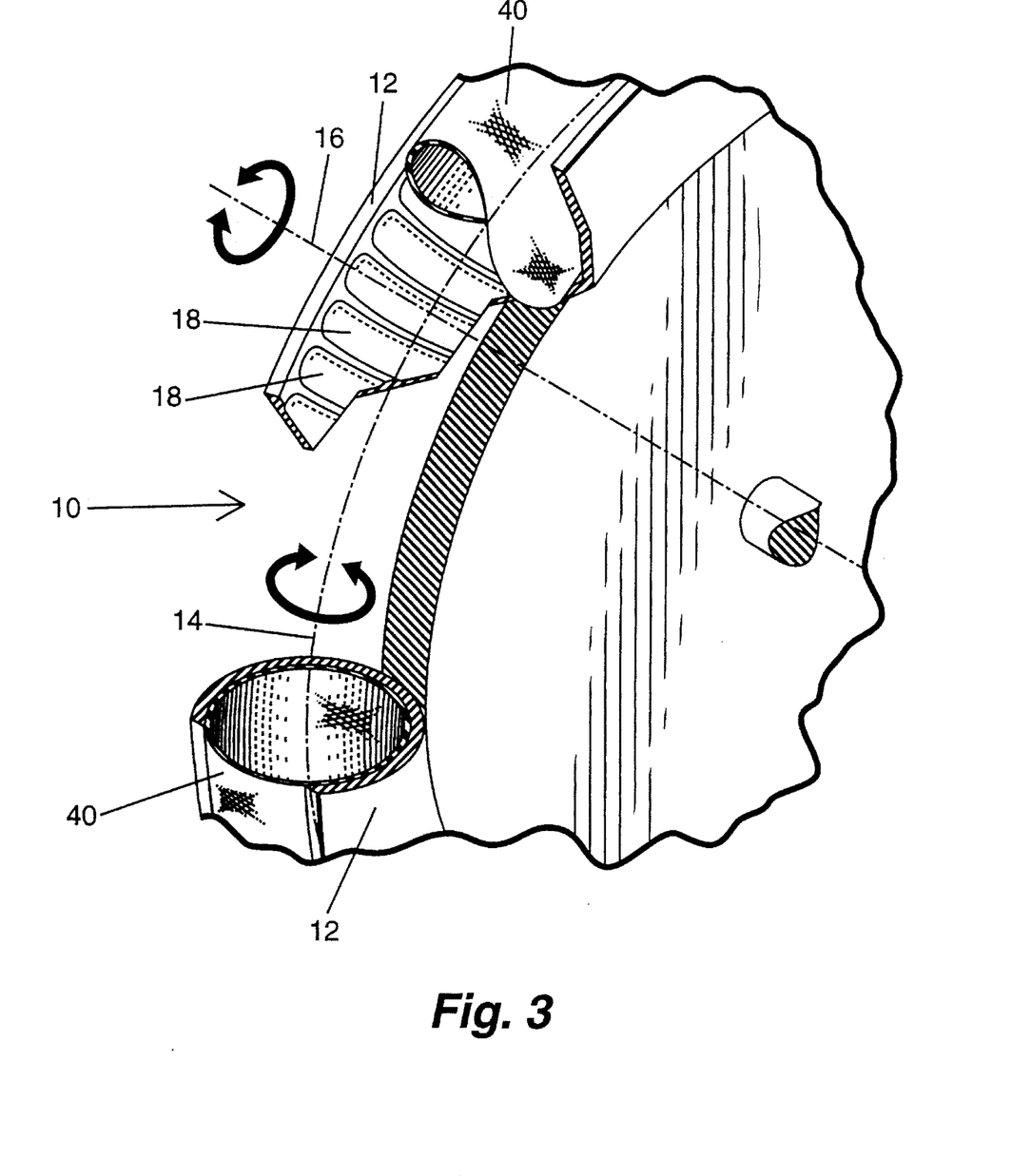
FIG. 3 shows a detail perspective view of a woven toroidal member and frame.
Figure 4:
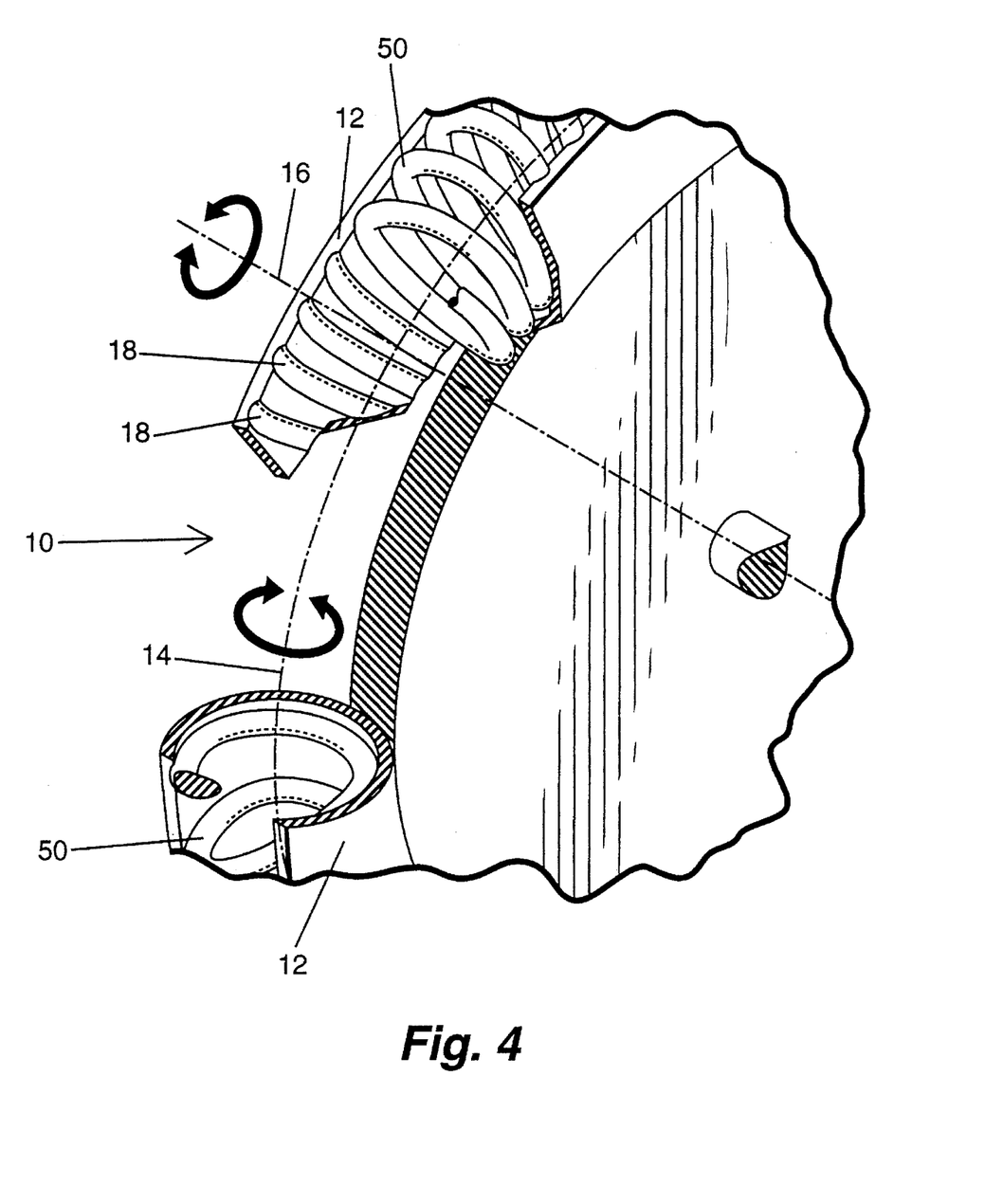
FIG. 4 shows a detail perspective view of a helical toroidal member and frame.

FIGS. 2 through 5 show additional embodiments of the biaxial idler in detail perspective views, each of which includes cross-section and cut-away views of the frame and toroidal member [e.g. 20,30,40,50,60]. FIG. 2 shows an embodiment that employs a hollow toroidal member 30. The embodiment in FIG. 3 uses a woven toroidal member 40. In FIG. 4 appears an embodiment employing a helical toroidal member 50. The embodiment in FIG. 5 has an interlinked disk toroidal member 60, which includes an interlinking annular element 62 and disk elements 64.

Figure 6:
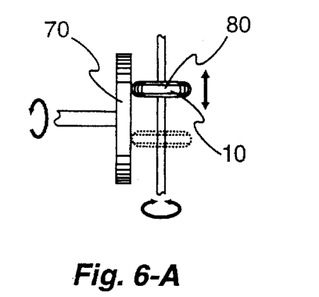
Figures 1, 6:
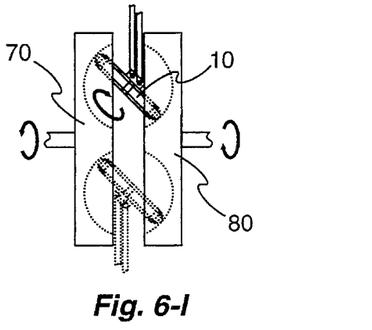

FIGS. 6-A through 6-J show the biaxial idler's implementation in a variety of different types of continuously variable transmission. Each of these simplified side views portrays a functional relationship between a biaxial idler 10, a driving member 70, and a driven member 80. Note, however, that members have been designated as "driving" or "driven" in a somewhat arbitrary manner and solely for clarity. In theory, the driven and driving members of any given continuously variable transmission might be interchanged, thus causing power to flow opposite the direction shown.

Each of the FIGS. 6-A through 6-J shows biaxial idler 10 in both a primary and secondary position. An idler in the primary position appears in solid lines unless an intervening object obscures it; then the idler appears in dashed lines. An idler in the secondary position always appears in dashed lines. In each of the continuously variable transmissions portrayed in FIGS. 6-A through 6-J, these primary and secondary idler positions represent merely two of a theoretically infinite number of positions that the biaxial idler 10 might occupy. Each of these infinite positions corresponds to a unique torque ratio.

FIG. 6-A shows a continuously variable transmission in which the biaxial idler 10 moves laterally across the face of the driving member 70, a rotating disk. In this transmission, the biaxial idler doubles as the driven member 80. FIG. 6-B shows the biaxial idler moving laterally between the parallel faces of the driving and driven members, both of which are rotating disks. FIG. 6-C shows the biaxial idler 10 moving laterally between the concave faces of driving and driven members that are rotating cones.

FIG. 6-D shows the biaxial idler moving laterally along the length of the driving member 80, a rotating cone. In this transmission, the biaxial idler 10 doubles as the driven member 80. FIG. 6-E shows a continuously variable transmission in which the biaxial idler moves lengthwise between the parallel surfaces of the driving and driven members, cones that point in opposite directions and that rotate on parallel axes. FIG. 6-F shows the biaxial idler 10 moving laterally along the lengths of cone-like driving and driven members. These members have concave surfaces and rotate on axes 90 degrees apart in the same plane.

FIG. 6-G shows a continuously variable transmission in which the biaxial idler 10 moves between the concave surface of a cone-like driving member 70 and the concave surface of a cup-like driven member 80. These members rotate on axes that are 90 degrees apart in the same plane. FIG. 6-H shows a continuously variable transmission in which the biaxial idler 10 moves between the concave surface of a cylinder-like driving member 70 and the concave surface of a barrel-like driven member 80. These members rotate on axes that lie on the same line. For the sake of clarity, in FIG. 6-H the secondary position of the biaxial idler 10 appears to one side of the primary position. FIG. 6-I shows a toric continuously variable transmission. In this sort of continuously variable transmission, the biaxial idler 10 moves between the concave surfaces of disk-like driving 70 and driven members 80. These members rotate on axes that lie on the same line.

FIG. 6-J shows a continuously variable transmission in which the biaxial idler twists between the surfaces of cylindrical driving 70 and driven members 80. These members rotate on axes 90 degrees apart in parallel planes.

A biaxial idler 10 operates in fundamentally the same manner in each of its many embodiments, some of which appear in FIGS. 1 through 5. In each of these embodiments, a frame 12 holds a flexible and resilient toroidal member.

Being flexible, the toroidal member can sustain the bending that occurs as it rotates about an annular axis 14. Being resilient, the toroidal member maintains substantially the same shape as it rotates about the annular axis. To describe its operation in geometric terms, the toroidal member [e.g. 20,30,40,50,60] undergoes compression and expansion between points on line segments parallel to, and non-congruent with, tangents of the annular axis 14. The toroidal member's flexibility and resiliency ensure that it can both accommodate and endure this compression and expansion.

The frame 12 holds the toroidal member [e.g. 20,30,40, 50,60] and allows it to rotate about a straight axis 16. The frame can include grooves 18 to help prevent the toroidal member from sliding across the frame in a direction parallel to the annular axis 14. The toroidal member and frame thus rotate together with regard to the straight axis. With regard to the annular axis, on the other hand, only the toroidal member rotates.

The biaxial idler 10 in FIG. 1 shows a solid toroidal member 20. This sort of toroidal member achieves flexibility and resiliency by being made out of a material, such as rubber or soft plastic, that has those same properties. Grooves 18 in FIG. 1 can help prevent the solid toroidal member 20 from sliding across the frame 12 parallel to the annular axis 14 by increasing the coefficient of friction for movement in that direction. At the same time, the grooves decrease friction between the frame and the solid toroidal member when the solid toroidal member rotates about annular axis 14. This decreases the work needed for, and the wear associated with, shifting gears.

FIG. 2 shows a biaxial idler including a hollow toroidal member 30. Like the solid toroidal member 20 shown in FIG. 1, the hollow toroidal member 30 achieves flexibility and resiliency by being made out of a material, such as rubber or soft plastic, that has those same properties. Unlike the solid toroidal member, however, the hollow toroidal member 30 requires less of such material for its construction. It can thus be made lighter than its solid counterpart. The area completely enclosed by the hollow toroidal member might be filled with liquid or gas, which could then be pressurized to vary the flexibility and resiliency of the hollow toroidal member as needed. Grooves 18 in FIG. 2 work in the same fashion as those in FIG. 1.

In FIG. 3 appears a woven toroidal member 40, which possesses flexibility and resiliency thanks to the many strands that combine to create its fabric. In effect, each single strand functions like a helical toroidal member 50 made of fine wire or plastic. Though too weak to work alone, when woven together in a hollow toroid these single strands create the strong and uniform structure of the woven toroidal member. Grooves 18 can help prevent the woven toroidal member 40 from sliding across the frame 12 parallel to the annular axis 14 by increasing the friction of movement in that direction. At the same time, the grooves decrease friction between the frame and the woven toroidal member when the solid toroidal member rotates about annular axis 14. This decreases the work needed for, and the wear associated with, shifting gears.

A helical toroidal member 50, as shown in FIG. 4, wins flexibility and resiliency grace of its spring-like structure. The helical toroidal member would probably benefit most from being made out of the same material, such as metal or hard plastic, that typically constitutes springs. The coils of the helical toroidal member fit into grooves 18. By holding these coils in place, the grooves can prevent the helical toroid member from sliding across the frame in a direction parallel to the annular axis. At the same time, the grooves allow the helical toroidal member, as it rotates about annular axis 14, to easily slide across the frame. This decreases the work needed for, and the wear associated with, shifting gears.

Figure 5:
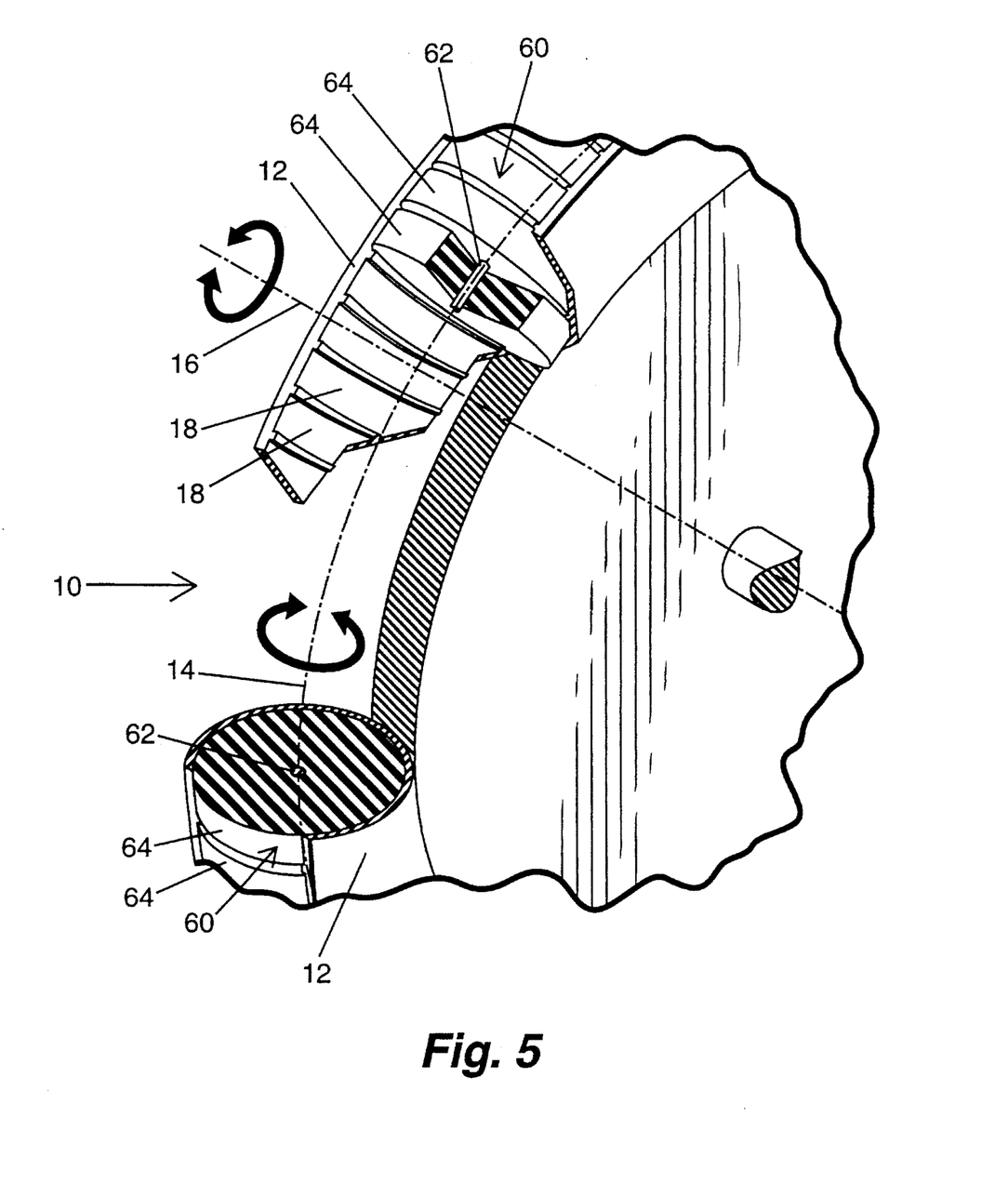
FIG. 5 shows a detail perspective view of an interlinked-disk toroidal member and frame.

FIG. 5 shows all interlinked disk toroidal member 60, which comprises an interlinking annular element 62 and disk elements 64. The interlinking annular element serves primarily to link the disk elements together, and might be made of wire cable or plastic fiber. The interlinking annular element is congruent with annular axis 14. Almost all of the flexibility and resiliency of this sort of toroidal member comes from the interlinking annular element. The disk elements thus need not possess such traits, and might be made of almost any light and durable material. The disk elements fit into grooves 18, which can prevent the disk elements from sliding across the frame in a direction parallel to the annular axis. At the same time, the grooves allow the disk elements, as they rotate about the annular axis, to easily slide across the frame. This decreases the work needed for, and the wear associated with, shifting gears.

In summary, the present invention for a biaxial idler includes a flexible and resilient toroid and a frame for holding it. This frame allows the toroid to rotate both about its annular axis and, independently, about a straight axis substantially orthogonal to the toroid's annular axis. When used in a continuously variable transmission, this biaxial idler provides several advantages over the prior art.

Its unique design allows the biaxial idler to roll laterally across the surfaces of a transmission's driving and driven members regardless of their rotation. There is thus no need to disengage the driving and driven members when the continuously variable transmission "shifts gears." A transmission using the biaxial idler also wastes little power on shifting gears. By the same token, the biaxial idler allows continuously variable transmissions to avoid excess wear. When used in a toric continuously variable transmission, the biaxial idler provides a simple means of shifting gears whether the transmission is in motion or at rest.

Its uncomplicated design gives the biaxial idler few parts, thus rendering it easy to build, rugged, simple to repair, amenable to miniaturization, and lightweight. Moreover, the biaxial idler can readily be built to present an unbroken edge to the transmission's driving and driven members, thus ensuring that the idler transmits torque smoothly, quietly, and continuously.

Although the description above contains many specificities, these should not be construed to limit the scope of the present invention for a biaxial idler. Rather, they merely provide illustrations of some of the presently preferred embodiments of the invention. For example, the toroidal member can be made out of other flexible and resilient materials or structures; the frame holding the toroidal member can use a variety of types of grooves, knobs, or other structures to prevent the toroidal member from slipping along its annular axis; the biaxial idler can serve in many sorts of continuously variable transmission; etc.

The scope of the invention should thus be determined by the appended claims and their legal equivalents, rather than by the examples given above.

I claim:

1. A continuously variable torque transmitter comprising:
   a) a toroidal member of substantially circular cross-section wherein said toroidal member rotates about an annular axis substantially centered within said toroidal member, and
   b) a frame comprising means for allowing said toroidal member to rotate both about said annular axis and about a straight axis substantially orthogonal to and equidistant from said annular axis.

2. A continuously variable torque transmission according to claim 1, wherein said toroidal member comprises a flexible and resilient material.

3. A continuously variable torque transmitter according to claim 1, wherein said toroidal member comprises a hollow structure parallel to and enclosing said annular axis.

4. A continuously variable torque transmitter according to claim 3, wherein said toroidal member comprises a material woven out of flexible and resilient fibers.

5. A continuously variable torque transmitter according to claim 1, wherein said toroidal member comprises a helical structure centered about and wrapped around said annular axis.

6. A continuously variable torque transmitter according to claim 1, wherein said toroidal member comprises:
   a) disks including axes of rotation substantially orthogonal to and equidistant from the circular edges of said disks, said disks being situated with axes substantially congruent to said annular axis; and
   b) means for flexibly linking said disks in assembled relationship so as to allow said disks to rotate about said annular axis.

7. A continuously variable torque transmitter according to claim 1, wherein said frame includes means for holding said toroidal member in assembled relationship.

8. A continuously variable torque transmitter according to claim 1, wherein said annular axis includes segments and said frame includes means for substantially preventing said toroidal member from moving relative to said frame in directions substantially parallel to nearest said segment of said annular axis.

9. A continuously variable torque transmitter comprising:
   a) a toroidal member of substantially circular cross-section wherein said toroidal member rotates about an annular axis substantially centered within said toroidal member, and
   b) a frame including means for substantially preventing said toroidal member from moving in a direction parallel to said annular axis and means for allowing said toroidal member to rotate independently both about said annular axis and about a straight axis substantially orthogonal to and equidistant from said annular axis.

10. A continuously variable torque transmitter according to claim 9, wherein said toroidal member comprises a flexible and resilient material.

11. A continuously variable torque transmitter according to claim 9, wherein said toroidal member comprises a hollow structure parallel to and enclosing said annular axis.

12. A continuously variable torque transmitter according to claim 11, wherein said toroidal member comprises a material woven out of flexible and resilient fibers.

13. A continuously variable torque transmitter according to claim 9, wherein said toroidal member comprises a helical structure centered about and wrapped around said annular axis.

14. A continuously variable torque transmitter according to claim 9, wherein said toroidal member comprises:
   a) disks including axes of rotation substantially orthogonal to and equidistant from the circular edges of said disks, said disks being situated with axes substantially congruent to said annular axis; and
   b) means for flexibly linking said disks in assembled relationship so as to allow said disks to rotate about said annular axis.

15. A continuously variable torque transmitter according to claim 9, wherein said frame includes means for holding said toroidal member in assembled relationship.

16. A continuously variable torque transmitter comprising:
   a) a member of substantially circular cross-section wherein the member rotates about a curved axis substantially centered within said member,
   b) wherein said member may freely rotate about said curved axis, and
   c) a frame including means for substantially preventing said member from moving in a direction parallel to said curved axis and means for allowing said member to rotate independently both about said curved axis and about a straight axis substantially orthogonal to and equidistant from said curved axis.

17. A continuously variable torque transmitter according to claim 16, wherein said member comprises a hollow structure parallel to and enclosing said curved axis.

18. A continuously variable torque transmitter according to claim 17, wherein said member comprises a material woven out of flexible and resilient fibers.

19. A continuously variable torque transmitter according to claim 16, wherein said member comprises a helical structure centered about and wrapped around said curved axis.

20. A continuously variable torque transmitter according to claim 16, wherein said member comprises:
   disks, wherein the axes of rotation are substantially equidistant from the circular edges of said disks, said disks being situated with axes substantially congruent to said curved axis.

* * * * *